United States Patent [19]

Berends et al.

[11] Patent Number: 5,896,957
[45] Date of Patent: Apr. 27, 1999

[54] WHEEL BLOCKING DEVICE

[75] Inventors: Jan Berends; Jurjen J. De Jong, both of Buitenpost, Netherlands

[73] Assignee: Stertil B.V., Koostertille, Netherlands

[21] Appl. No.: 08/946,371

[22] Filed: Oct. 7, 1997

Related U.S. Application Data

[63] Continuation of application No. 08/507,424, Oct. 13, 1995.

[30] Foreign Application Priority Data

Dec. 28, 1993 [NL] Netherlands ............................ 9302280

[51] Int. Cl.$^6$ .................................................. B60G 67/00
[52] U.S. Cl. ............................................. 188/32; 414/401
[58] Field of Search .................................. 188/32, 36, 4; 414/401, 584

[56] References Cited

U.S. PATENT DOCUMENTS

| | | | |
|---|---|---|---|
| 4,207,019 | 6/1980 | Cone | 414/373 |
| 4,679,974 | 7/1987 | Blunden | 410/30 |
| 5,531,557 | 7/1996 | Springer | 414/401 |
| 5,553,987 | 9/1996 | Ellis | 414/401 |

FOREIGN PATENT DOCUMENTS

| | | |
|---|---|---|
| 0537075 | 4/1993 | European Pat. Off. . |
| 2689845 | 10/1993 | France . |

*Primary Examiner*—Matthew C. Graham
*Attorney, Agent, or Firm*—Michael, Best & Friedrich LLP

[57] ABSTRACT

A device for blocking wheels of a vehicle, including elongate guide means, a wheel block carrier guided slidably in a lengthwise direction of the guide means and including a wheel block guided for movement transverse relative to the lengthwise direction, and control and drive means for moving the wheel block carrier relative to the guide means and for moving the wheel block relative to the wheel block carrier.

8 Claims, 7 Drawing Sheets

WHEEL BLOCKING DEVICE

This is a continuation of application Ser. No. 08/507,424, filed Oct. 13, 1995, entitled WHEEL BLOCKING DEVICE.

FIELD OF THE INVENTION

The invention relates to a device for blocking wheels of a vehicle.

BACKGROUND OF THE INVENTION

Such a device is used particularly at loading stations for trucks, wherein a truck for loading is reversed against an opening in the wall of a distribution centre or the like and the truck is loaded by means of a fork-lift truck which drives from the building into the inside of the truck over a loading ramp. It is herein of the very greatest importance that the truck stands correctly positioned and immobile. If the truck were able to move away, for instance because the brake had not been applied, serious accidents could occur.

The invention now has for its object to provide a device with which a truck can be placed precisely in front of a loading door in a building and can be blocked in reliable manner and in the correct manner.

SUMMARY OF THE INVENTION

The device according to the invention is characterized in claim 1. After the truck has been driven to the correct location the wheel block carrier is shifted into the correct position and the wheel block is slid in transverse direction in front of the wheel. By sliding the wheel block carrier in suitable manner with the wheel block moved outward the wheel block is pressed against the wheel and this wheel and the truck thus blocked.

Because the wheel block is moved in transverse direction in order to place it in engagement with the wheel, it does come into conflict with low protruding parts of the truck such as spare wheel carriers, housings and the like. The device according to the invention can be mounted simply on the ground. Optionally, only limited anchoring constructions are required in the ground.

A favourable embodiment of the invention is characterized in claim 2. The elongate guide member provides together with an identical guide member optionally disposed opposite the guiding of the rear wheels of the truck when it is being manoeuvred in reverse into the correct position. The guide members form on the one hand an indication for the driver of the path to be followed and on the other they hold the wheels in the correct track. By now integrating the guide means for the wheel block carrier in such a guide member an effective construction is obtained.

A further favourable development is characterized in claim 3. The guide tube has well-rounded surfaces whereby the risk of damage to a vehicle wheel coming into contact therewith is small. The guide tube is moreover rigid and forms a good guiding for the element telescopically slidable out of the tube.

A suitable embodiment of the drive means is characterized in claim 4. The position of the wheels for blocking can vary considerably. In the case of a triple-shaft semi-trailer the rear wheel for blocking is placed comparatively far to the rear. In trailers with a single shaft placed in the centre or a tandem placed in the centre, the wheel for blocking will be situated much further forward. With the embodiment of claim 4 all occurring positions can be reached simply while a limited amount of space is taken up.

In order to prevent the wheel block being pushed aside, for instance due to clumsy manoeuvreing with the truck, and the device being thereby damaged, the step of claim 5 is preferably applied. The possibly lateral forces on the wheel block and wheel block carrier are absorbed by the guide rail.

A suitable embodiment for the wheel block is characterized in claim 6. A compact and reliable construction is hereby possible.

A further development is characterized in claim 7. The control of the wheel block movement can hereby take place remotely in simple manner.

According to a further development the step of claim 8 is applied. The wheel detector detects when the wheel block carrier is in the correct position for moving the wheel block into the active position. The control means can hereby control the device automatically to a very considerable extent so that after pressing a control button the truck is automatically blocked.

BRIEF DESCRIPTION OF THE DRAWINGS

The invention will be further elucidated in the following description with reference to the annexed figures.

DETAILED DESCRIPTION

Figure 1:
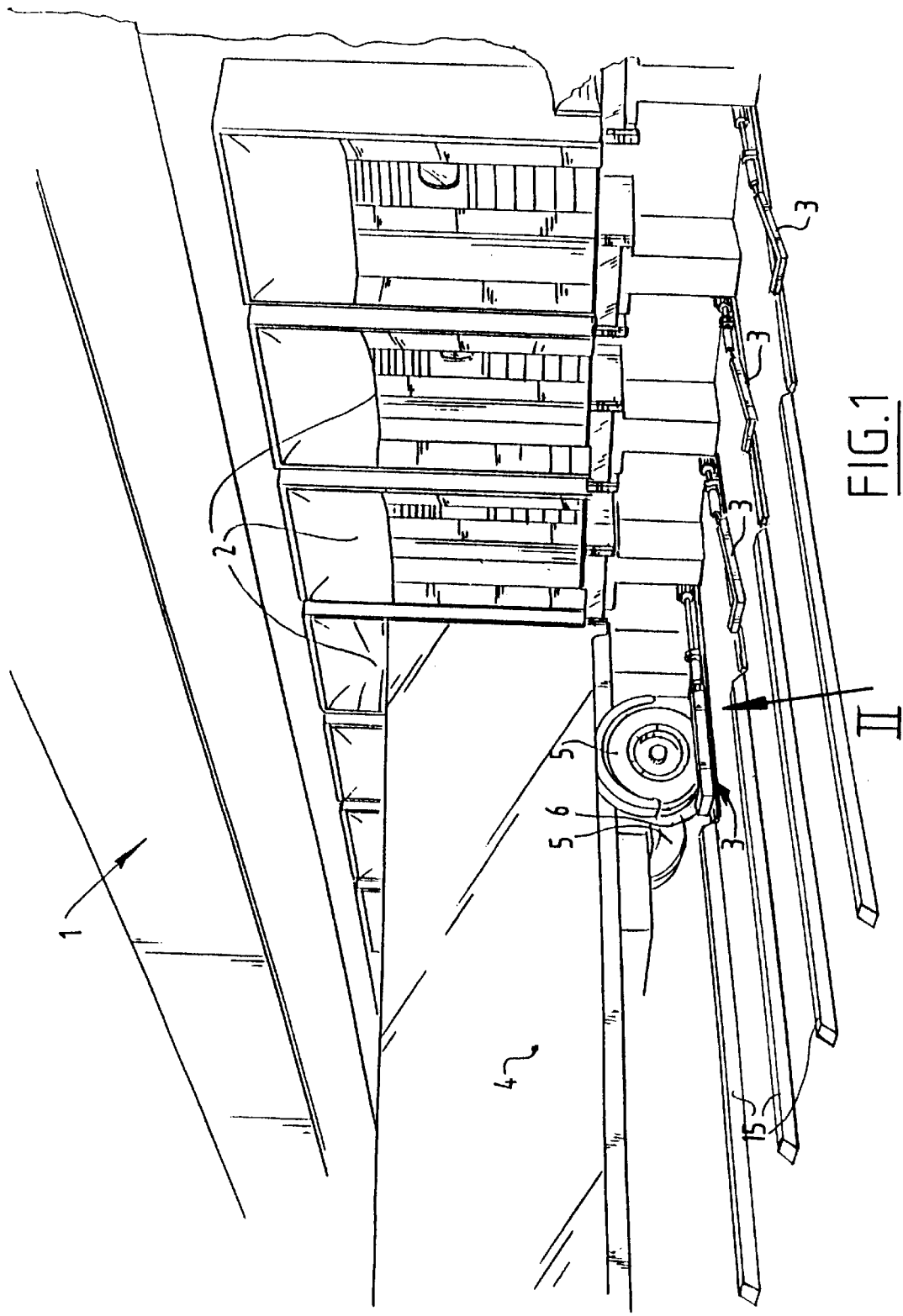
FIG. 1 shows a perspective view with partly broken away parts of an application of a number of devices according to the invention.

Designated with 1 in FIG. 1 is a distribution centre 1 with a number of loading doors 2 in front of which trucks 4 can be positioned. Trucks 4 reverse up to the loading door, whereafter goods can be loaded into the truck 4, for instance with a fork-lift truck, in a manner not to be described in detail.

Truck 4 is placed straight in front of a loading door 2. The driver is helped herein by wheel guides 15.

A device 3 according to the invention is placed close to each loading door 2. After truck 4 is arranged in the correct position in front of loading door 2 a rear wheel 5 can be blocked with this device so that truck 4 can thereafter no longer move unintentionally during loading of this truck 4.

Figure 2:
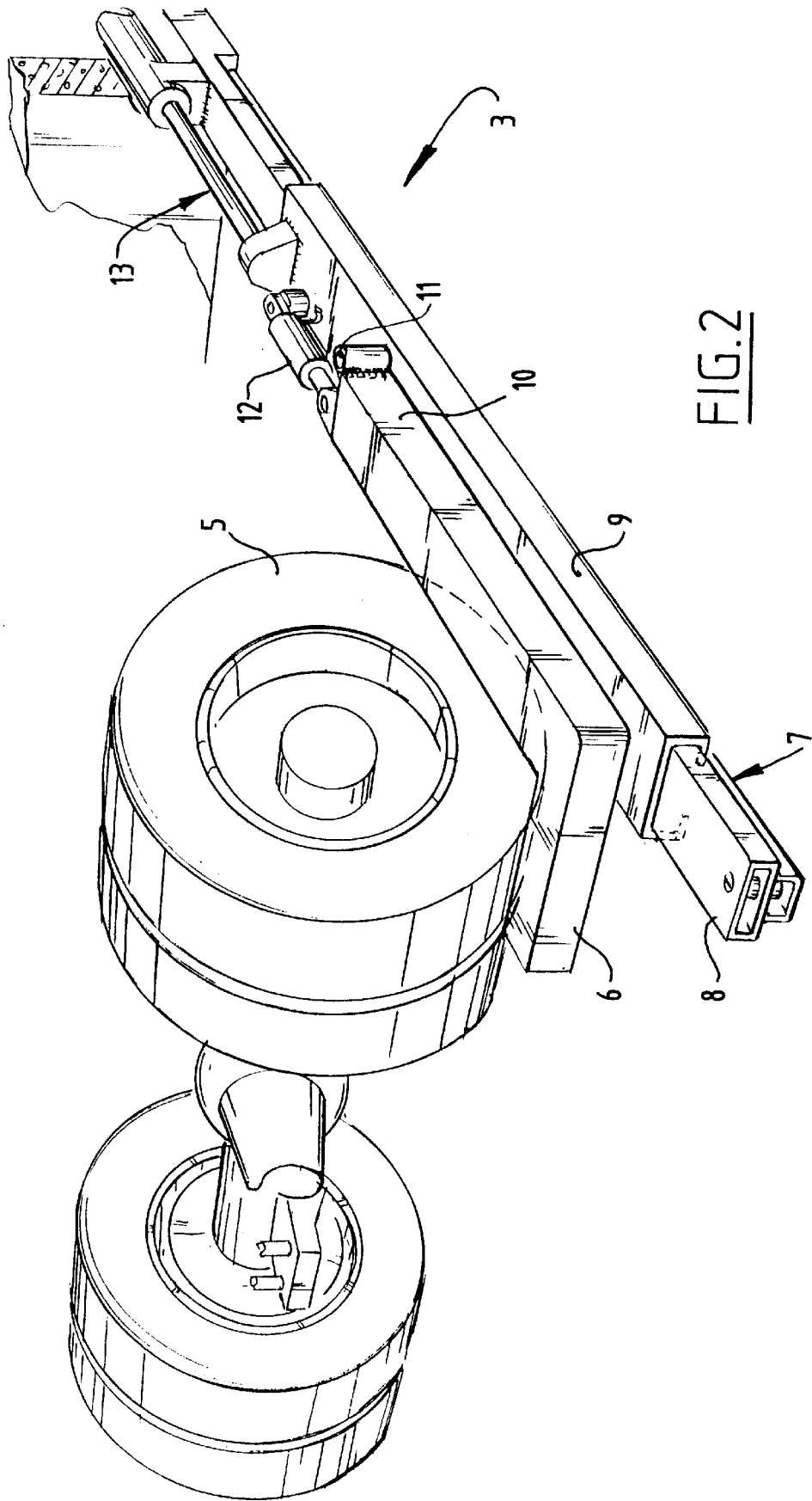
FIG. 2 shows a view according to arrow II in FIG. 1, with partly broken away parts.

As FIG. 2 shows in more detail, the device 3 according to the invention comprises guide means 7 which are formed by a rail 8 mounted on the ground and a carriage 9 guided slidably thereover. A wheel block carrier 10 is mounted on carriage 9 by means of a hinge 11. Situated on the end of wheel block carrier 10 is an arm 6 protruding in transverse direction which forms the wheel block. The wheel block carrier 10 with wheel block 6 can be swivelled on hinge 11 by means of a hydraulic cylinder 12 between a position swivelled outward relative to FIG. 2, in which the wheel block 6 is located outside the plane of wheel 5, and the drawn position in which wheel block 6 is moved in transverse direction in front of the wheel 5.

The carriage 9 is displaceable over rail 8 by means of a fixedly mounted hydraulic cylinder 13.

Blocking of wheel 5 takes place as follows.

After arranging of truck 4 the carriage 9 is moved forward using the hydraulic cylinder 13, wherein wheel block carrier 10 is held in the outward swivelled position because the cylinder 12 is extended. As soon as wheel block 6 has moved beyond wheel 5 the cylinder 12 is retracted whereby wheel block carrier 10 is moved into the position shown and wheel block 6 is thus positioned in transverse direction in front of the wheel 5. Cylinder 13 is subsequently retracted whereby carriage 9 moves rearward and wheel block 6 is placed into firm contact with wheel 5. Truck 4 is thus held immobile in its position.

As soon as truck 4 has been loaded the cylinder 12 is simply fed with hydraulic oil under pressure in order to move the wheel block 6 outward, and the truck 4 can depart immediately.

Figure 3:
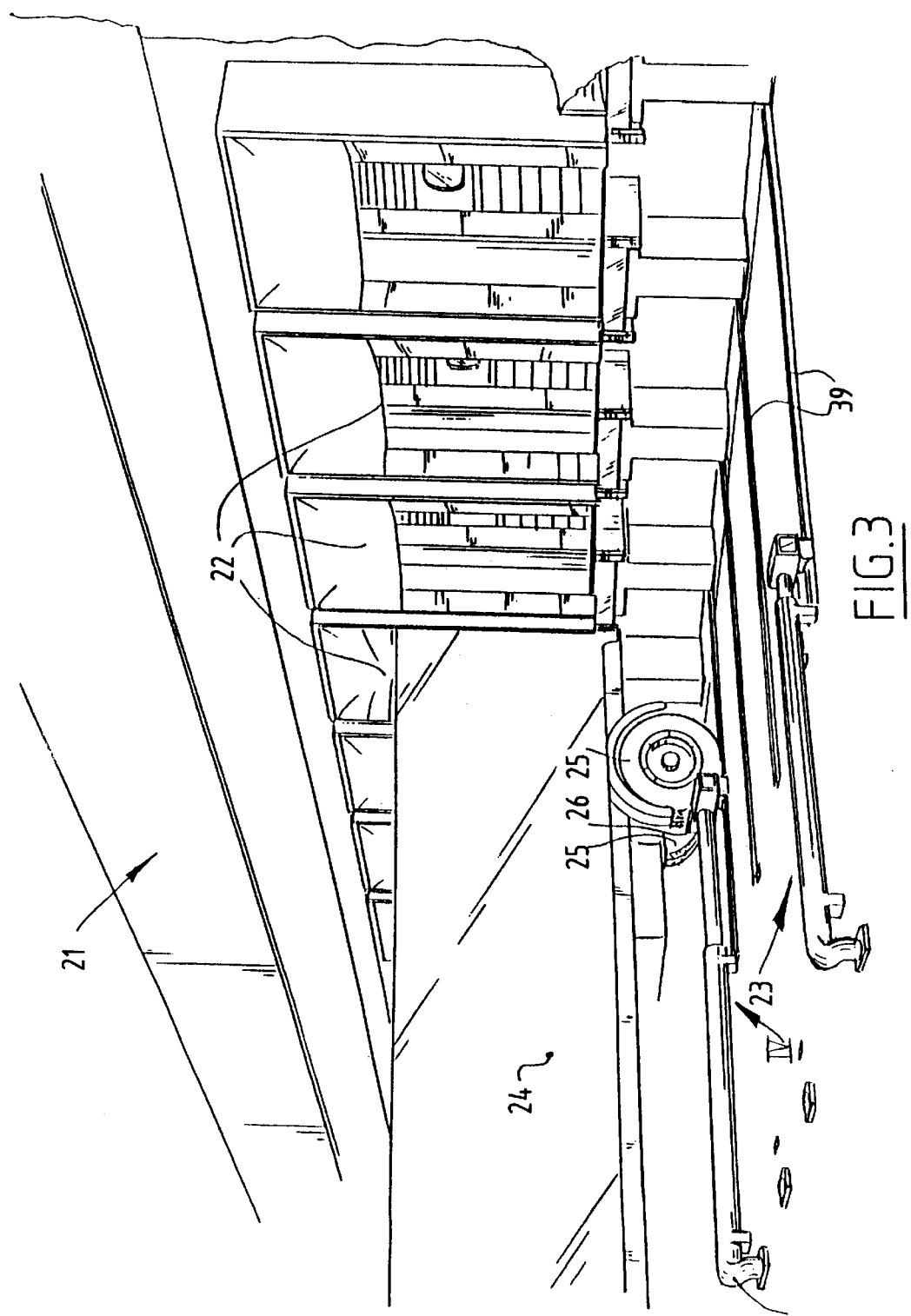
FIG. 3 shows a perspective view corresponding with FIG. 1 of another embodiment.

A favourable further development of the invention is shown in FIG. 3. This FIG. 3 corresponds with FIG. 1 except for the device of the invention, and corresponding parts are designated with the same reference numerals increased by 20.

As in the embodiment of FIG. 1, the truck 24 must be placed straight in front of loading door 22. In the embodiment shown here the guide members for the rear wheels are integrated with the blocking device. Truck 24 can reverse between the devices 23 wherein the rear wheels 25 are guided by devices 23 such that truck 24 comes to rest in the correct position in front of loading door 22.

After truck 24 has been driven into the correct position the rear wheels 25 are blocked with wheel blocks 26 of the device 23 which are pressed against the front side of wheels 25.

Figure 4:
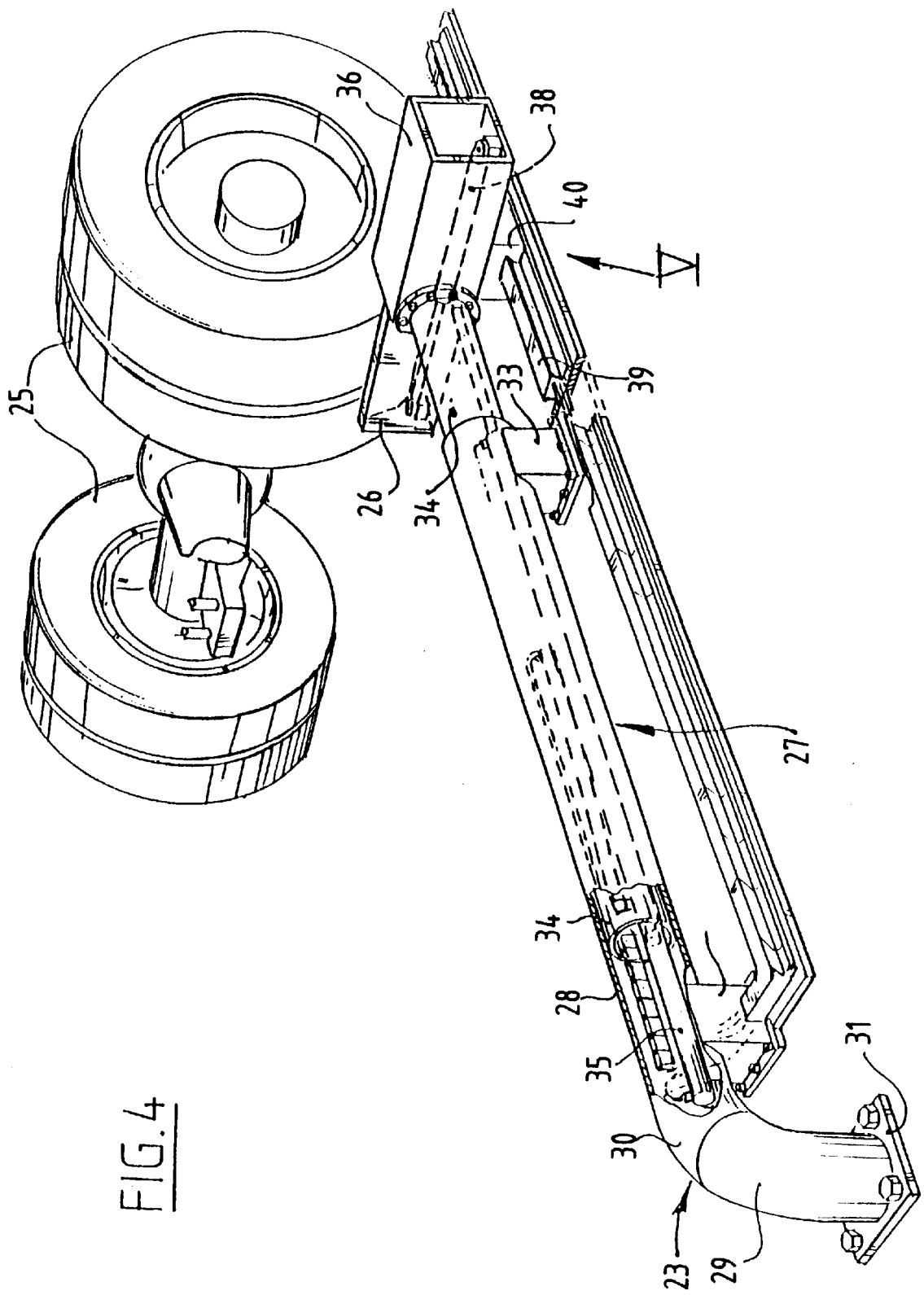
FIG. 4 shows a view according to arrow IV in FIG. 3, with partly broken away parts.

The device 23 is shown in more detail in FIG. 4. As can be seen therein, device 23 comprises an elongate guide member 27. Guide member 27 comprises a guide tube 28 having at the forward and a bend 30 of 45° lying in a horizontal plane and connecting thereto a bend 29 of 90° disposed in a vertical plane. Bends 29 and 30 provide a smooth entry between the guide members 27 placed opposite one another, so that the rear wheels of the truck are not damaged when being driven therein.

The guide member 27 is mounted firmly on the ground. The forward bend 29 is mounted onto the ground using a mounting plate 31, while under the straight part of guide tube 28 two further supports 32 and 33 are arranged. The manner of mounting depends on the condition of the ground on which the devices 23 are mounted. If this ground already has sufficient cohesion of itself, is for instance a concrete floor, the devices 23 can be mounted onto the ground with cotter bolts. In the case of a less firm ground it may be necessary to cast a concrete socle into the ground at the location of the mounting supports. Also in this case the operations for mounting the devices 23 according to the invention remain limited.

Received in guide tube 28 is an extending tube 34 which carries on its end a box-like wheel block carrier 36. The extending element 34 is slidable relative to guide tube 28 by means of a hydraulic cylinder 35.

Arranged under the wheel block carrier 36 is a carriage 40 which is in engagement with a guide rail. As shown, the guide rail has a swallowtail-shaped profile so that carriage 40 is locked onto the rail 39. In the embodiment of the device shown here the wheel block 26 is received slidably in wheel block carrier 36. Wheel block 26 can be slid in transverse direction in front of wheel 25 by means of a hydraulic cylinder 38.

Figure 5:
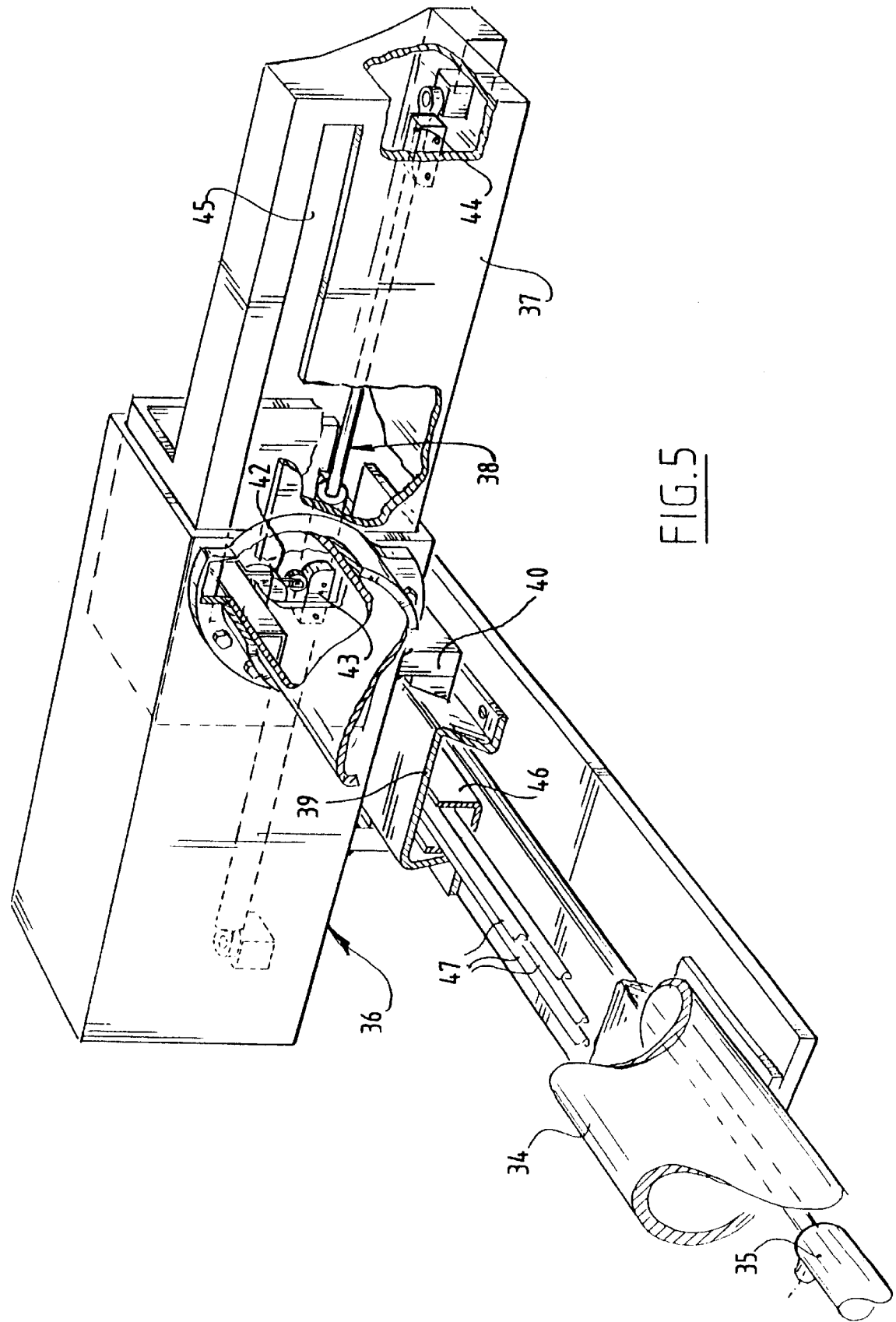
FIG. 5 shows a mirrored detail view according to arrow V in FIG. 4.

As shown in FIG. 5, a switch 42 is arranged in wheel block carrier 36 which co-acts with cams 43 and 44 in order to detect the retracted and extended situation of wheel block 37.

The rail 39 is folded from plate material so that a cavity is formed inside. Guide rails 39 can extend as far as the building 21 so that this cavity can be utilized in appropriate manner for feeding therethrough of conduits for operating the hydraulic cylinders 35 and 38 and signal lines inter alia for the switch 42.

In FIG. 5 is shown that a channel 46 is arranged in rail 39, in which channel hydraulic and electrical lines 47 are received.

The lines 47 are guided inside the device via the support 32. At the forward end of the device the hydraulic conduits can be directly connected to hydraulic cylinder 35. For operation of hydraulic cylinder 38 the conduits are guided through the extending element 34. To take up the longitudinal movement a conduit caterpillar can be mounted herefor in suitable manner in the extending element 34.

Figure 6:
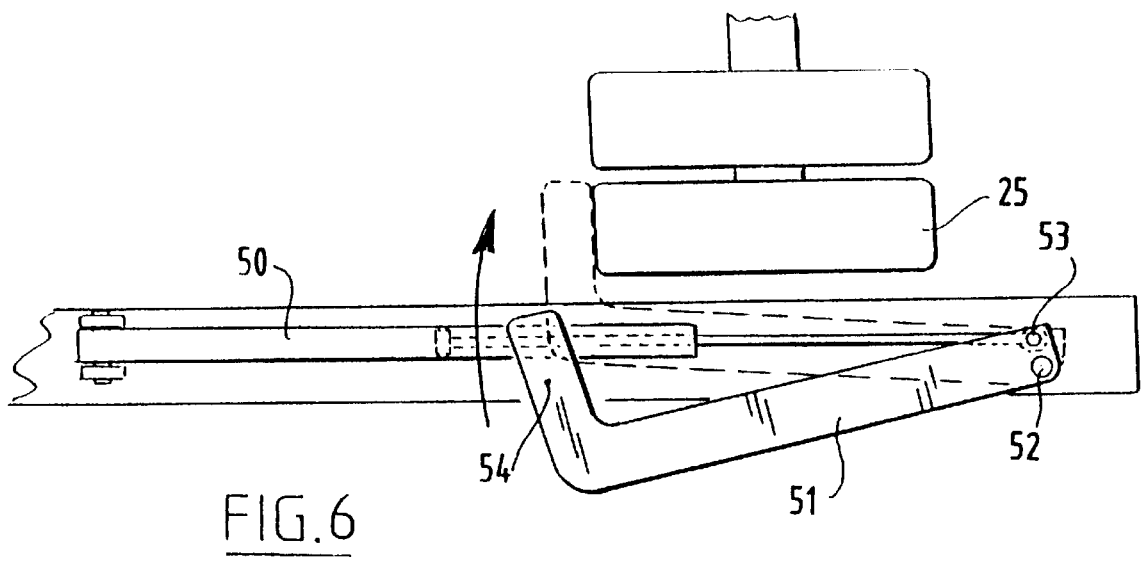
FIG. 6 and 7 show alternative embodiments of the wheel block.

FIG. 6 shows an alternative of the embodiment of FIG. 1. Herein the wheel block likewise comprises an L-shaped hook 51, the short leg of which forms the wheel block 54. The element 51 is mounted hingedly at 52. The actuating cylinder 50, which corresponds in function with cylinder 35 of FIG. 4 and 5, engages at 53 onto the L-shaped hook. It will be apparent that when cylinder 50 is fed with hydraulic oil such that the wheel block carrier is moved to the left, wheel block 54 remains out of engagement with the wheel. As soon as the direction of movement of cylinder 50 is reversed and there is a change-over to extending, the wheel block 54 is swivelled in front of wheel 25. Release of the blocking takes place in reverse sequence.

Figure 7:
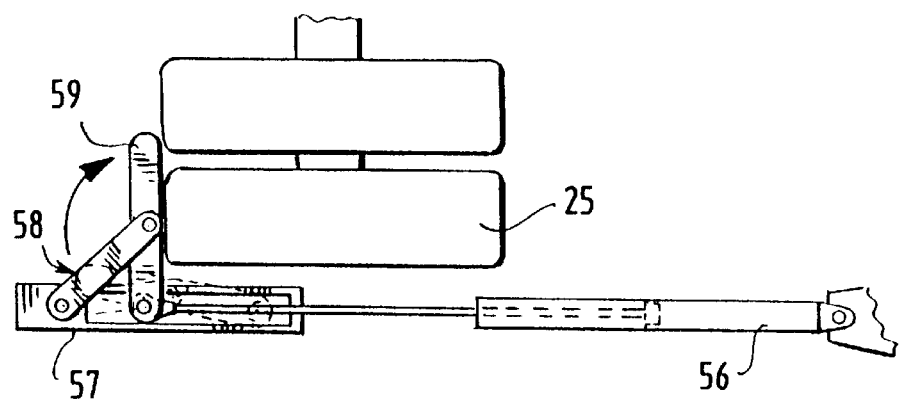

In the embodiment of FIG. 7 the wheel block 59 is arranged on a scissor linkage 58 which is connected to wheel block carrier 57. The latter can be moved reciprocally by cylinder 56. With a movement to the right the scissor linkage will be straightened, whereby wheel block 59 remains to the side. As soon as the piston rod of cylinder 56 moves to the left the wheel block 59 is moved in front of the wheel.

Figure 8:
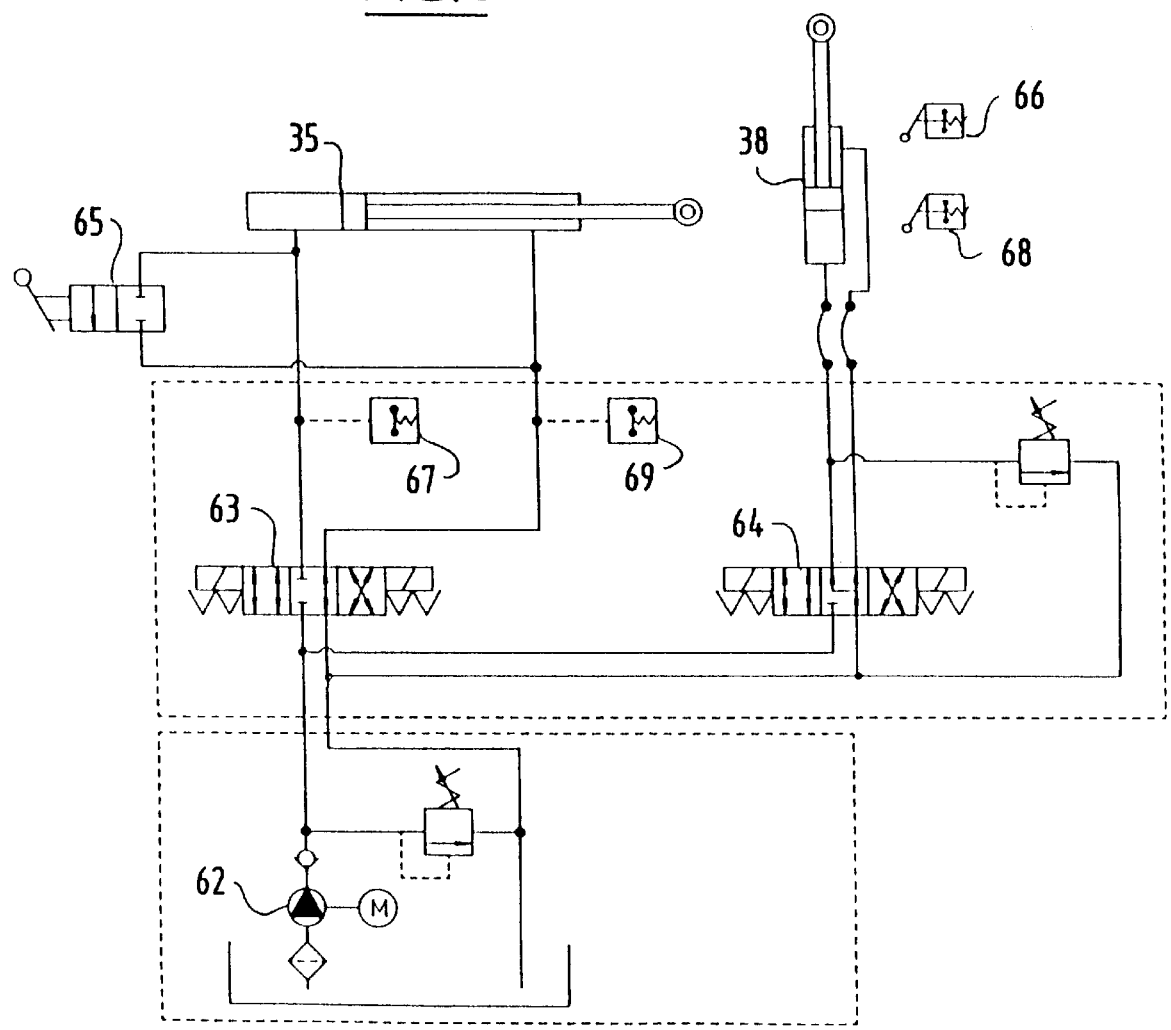
FIG. 8 shows a hydraulic diagram of the device according to the invention.

FIG. 8 shows a hydraulic diagram which can be applied in a device according to the invention. As according to FIG. 4 and 5, the hydraulic cylinder for shifting the wheel block carrier in longitudinal direction is designated 35 and the hydraulic cylinder for sliding the wheel block in transverse direction is designated 38.

FIG. 8 indicates in the usual manner the rest position. In order to extend the extending element 34 using hydraulic cylinder 35, the control valve 63 is moved to the right as seen in FIG. 8. Oil under pressure hereby flows from pump 62 to the space behind the piston, whereby the piston rod is pressed to the right. When control valve 63 is released the conduit to the cylinder is closed and the return conduit remains connected to the reservoir. Due to the hydraulic oil present behind the piston the latter remains in the extended position and cannot be pressed back. A force exerted by the wheel block on the wheel is thus maintained.

The wheel block is extended using the cylinder 38 by displacing valve 64 to the right as seen in FIG. 8. Oil under pressure from pump 62 is pumped under the piston whereby the piston rod slides outward. When valve 64 returns to the rest position the connections of cylinder 38 are mutually interconnected, whereby cylinder 38, in contrast to cylinder 35, is not blocked in the rest position.

An additional valve 65 is arranged with which the connections of cylinder 35 can be mutually connected. By operating valve 65 the piston rod can thus be pressed back. This option is present to still enable the goods vehicle 24 to be released in the case the hydraulic oil pressure fails or the control device malfunctions. Valve 65 is first actuated and the piston rod of cylinder 35 is pressed in slightly by hand. As soon as the load on wheel block 26 is thereby removed, the wheel block 26 can be pushed by hand into the wheel block carrier 36 because cylinder 38 is not blocked. When the wheel blocks have been moved out of the way the truck can depart.

Control of cylinders 35 and 38 preferably takes place automatically. For this purpose a wheel detector 70 is arranged on wheel block carrier 36. The control device preferably co-operates therewith as follows. In the rest position the wheel block 26 is retracted and the extending element fully extended. The wheel block carrier is thus situated in the rearmost position. After a truck has been driven into position a control key is pressed whereafter valve 63 is displaced to the left as seen in FIG. 8 so that the piston rod of cylinder 35 is retracted and the wheel block carrier moves forward. The wheel detector 70 gives a signal to the control device as soon as wheel 25 has been passed and the control device then switches valve 63 off and valve 64 to the position shifted to the right, whereby wheel block 26 is slid in front of wheel 25. After the switch 66 shown in FIG. 8 has detected that cylinder 38 has moved into its outermost position, the valve 64 is re-set into the intermediate position and valve 63 is placed in the position displaced to the right, whereby the wheel block is pressed against the wheel with cylinder 35. With the pressure switch 67 is detected when the wheel block is pressed with sufficient pressure against the wheel to block the truck adequately. The control device then switches valve 63 into the intermediate position in which, as noted, the cylinder 35 is blocked and holds the wheel block in the pressed-on position.

Release of the blocking takes place in reverse sequence. The valve 63 is first moved to the left whereby cylinder 35 withdraws the wheel block from the wheel. The valve 64 is subsequently placed in the position shifted to the left, whereby cylinder 38 retracts the wheel block. The end position is detected with the switch 68. Thereafter the valve 64 is again placed in the intermediate position and the valve 63 can be placed in the position shifted to the right to once again place cylinder 35 in the extended end position. Reaching of the end position is detected with the pressure switch 69.

Instead of switches 66 and 68, a single switch 42 with cams 43 and 44 as shown in FIG. 5 can also be used. This is one of the many possible modifications. The reason that the extended position of cylinder 35 is used as the starting position is that the slide-in movement takes place at greater speed because the suction area on the side of the piston rod is smaller than on the other side. The setting into operation of the blocking hereby takes the shortest possible time.

We claim:

1. A method of blocking a wheeled vehicle at a distribution centre using a wheel blocking device having a carriage and a wheel block mounted on the carriage, said method comprising the steps of:

positioning the vehicle in a desired location relative to the distribution centre such that the wheeled vehicle extends away from the distribution and defines a longitudinal axis, wherein a wheel of the vehicle defines a wheel plane;

moving the carriage relative to the vehicle along the longitudinal axis;

stopping the carriage at a desired position with the wheel block positioned out of the wheel plane;

moving the wheel block to a position immediately adjacent the wheel plane; and moving the wheel block from the position immediately adjacent the wheel plane into the wheel plane in a direction substantially transverse to the longitudinal axis.

2. A method as claimed in claim 1, wherein said step of moving the wheel block into the wheel plane comprises moving the wheel block in a substantially horizontal direction.

3. A method of blocking a wheeled vehicle at a distribution centre using a wheel blocking device having a carriage, a sensor mounted on the carriage, and a wheel block mounted on the carriage, said method comprising the steps of:

positioning the vehicle in a desired location relative to the distribution centre, wherein a wheel of the vehicle defines a wheel plane;

moving the carriage relative to the vehicle in a first direction;

sensing the position of the vehicle wheel with the sensor;

stopping the carriage at a desired position with the wheel block positioned out of the wheel plane; and moving the wheel block into the wheel plane after said sensing step.

4. A method as claimed in claim 3, further comprising, after said step of moving the wheel block, the step of moving the wheel block in a second direction opposite to the first direction until the wheel block contacts the wheel.

5. A method of blocking a wheeled vehicle at a distribution centre using a wheel blocking device having a carriage, a carrier having a length and being pivotally mounted on the carriage at a pivot axis, and a wheel block mounted on the carrier, said method comprising the steps of:

positioning the vehicle in a desired location relative to the distribution centre such that the vehicle extends away from the distribution centre and defines a longitudinal axis, wherein a wheel of the vehicle defines a wheel plane;

moving the carriage relative to the vehicle along the longitudinal axis;

positioning the carriage at a desired position adjacent to the wheel of the vehicle with the wheel block out of the wheel plane and with the pivot axis longitudinally spaced relative to the wheel block a distance substantially equal to the carrier length; and pivoting the carrier so that the wheel block moves into the wheel plane, while maintaining the pivot axis longitudinally spaced relative to the wheel block a distance substantially equal to the carrier length.

6. A method as claimed in claim 5, wherein said moving step comprises maintaining both the carrier and the wheel block out of the wheel plane.

7. A method as claimed in claim 5, wherein the wheel includes two ends, and wherein said positioning the carriage step comprises transversely aligning the pivot axis on one end of the wheel and transversely aligning the wheel block on the other end of the wheel.

8. A method as claimed in claim 7, wherein said pivoting step includes maintaining the pivot axis and wheel block transversely aligned on opposing ends of the wheel.

\* \* \* \* \*